July 2, 1963   C. DEJ. HERCULES   3,095,932
VARIABLE-PITCH BLADE PROPELLER
Filed Dec. 14, 1959   2 Sheets-Sheet 1
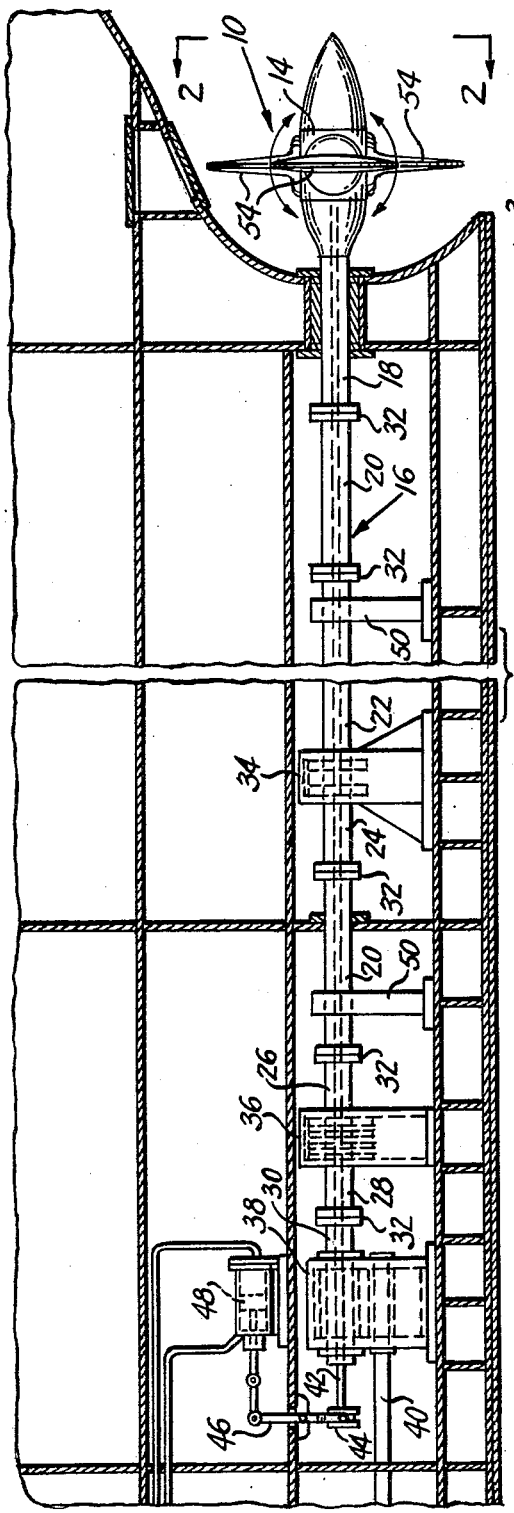
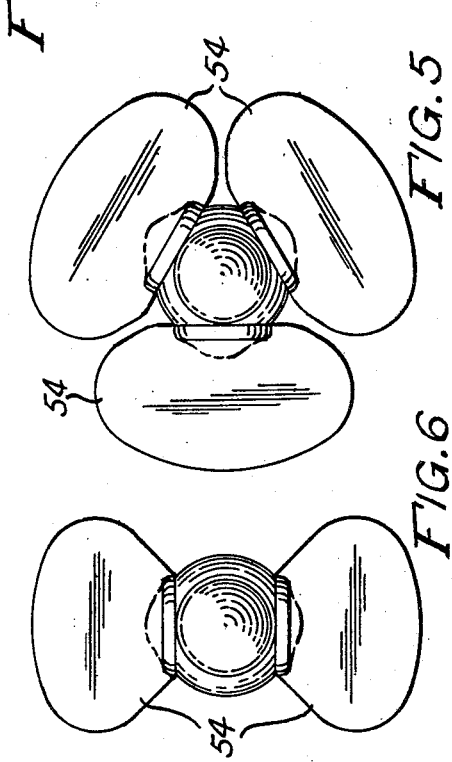
INVENTOR.
CHRISTOPHER D. HERCULES
BY Walter S. Pawl
ATTORNEY July 2, 1963  C. DEJ. HERCULES  3,095,932
VARIABLE-PITCH BLADE PROPELLER
Filed Dec. 14, 1959  2 Sheets-Sheet 2

INVENTOR.
CHRISTOPHER D. HERCULES
BY
Walter S. Paul
ATTORNEY

United States Patent Office 3,095,932
Patented July 2, 1963

3,095,932
VARIABLE-PITCH BLADE PROPELLER
Christopher DeJ. Hercules, 4640 Q St. NW.,
Washington, D.C.
Filed Dec. 14, 1959, Ser. No. 859,535
2 Claims. (Cl. 170—160.43)

This invention relates to variable-pitch blade propellers and control means therefor.

The object of this invention is to provide simple, compact and efficient control means for variable-pitch propellers working in a fluid such as water or air, and which might be used for ships, aircraft, windmills, mixers, etc.

A further object is to provide a streamlined hub casing of reasonably small diameter for the propeller with large diameter radial bearings for two or more adjustable-pitch blades spaced equally around the propeller axis, and axially movable means in the casing geared to said blades for simultaneously rotatably adjusting all of the blades to correspondingly vary their pitch.

A further object is to make the movable means in the above construction in the form of rack-yokes, each having an internal rack on one of its axially extending legs meshed with an arcuate rack or gear portion on the corresponding side of a blade shaft, and an axial guide bearing on the opposite leg in contact with a cylindrical surface on the opposite side of the blade shaft for maintaining the rack and gear portion in proper mesh during adjustment with minimum friction at the single line contact between the guide surfaces, and at the outer axial guide surfaces of the legs, which are guided by the inner guide walls of the casing.

A further object is to provide a composite rack-yoke member in the above construction when two or more blades are used, whereby the rack of one individual yoke is provided with a guide surface to serve as a guide leg of the adjacent individual yoke, thus simplifying the construction and making it more compact.

A further object is to provide a hydraulically or other power actuated remote controlled rod connected to the above movable yoke means for precisely adjusting the blade pitch for forward or reverse operation.

Figure 3:
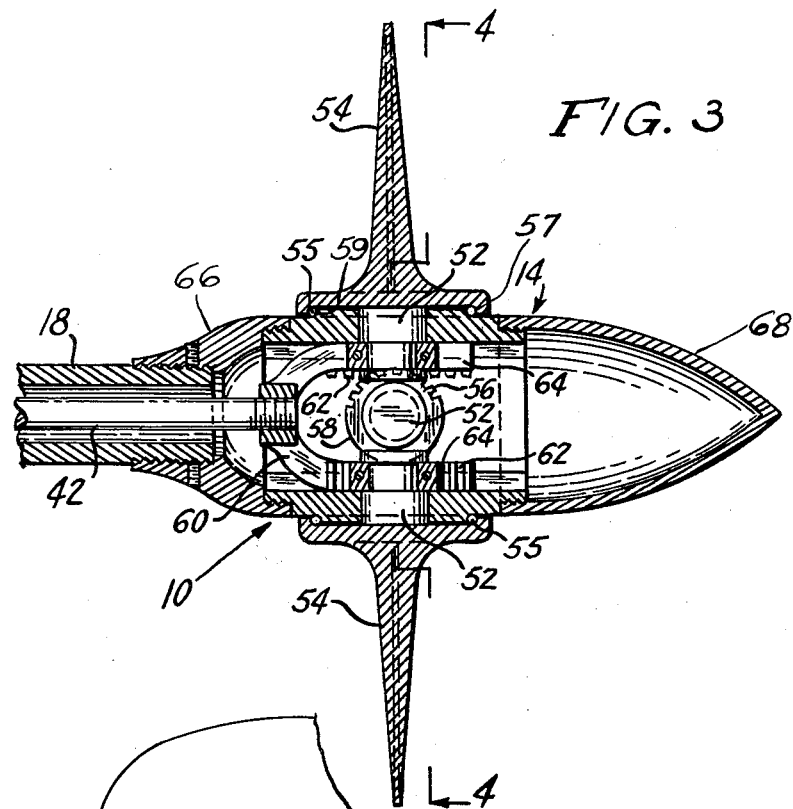
Figure 4:
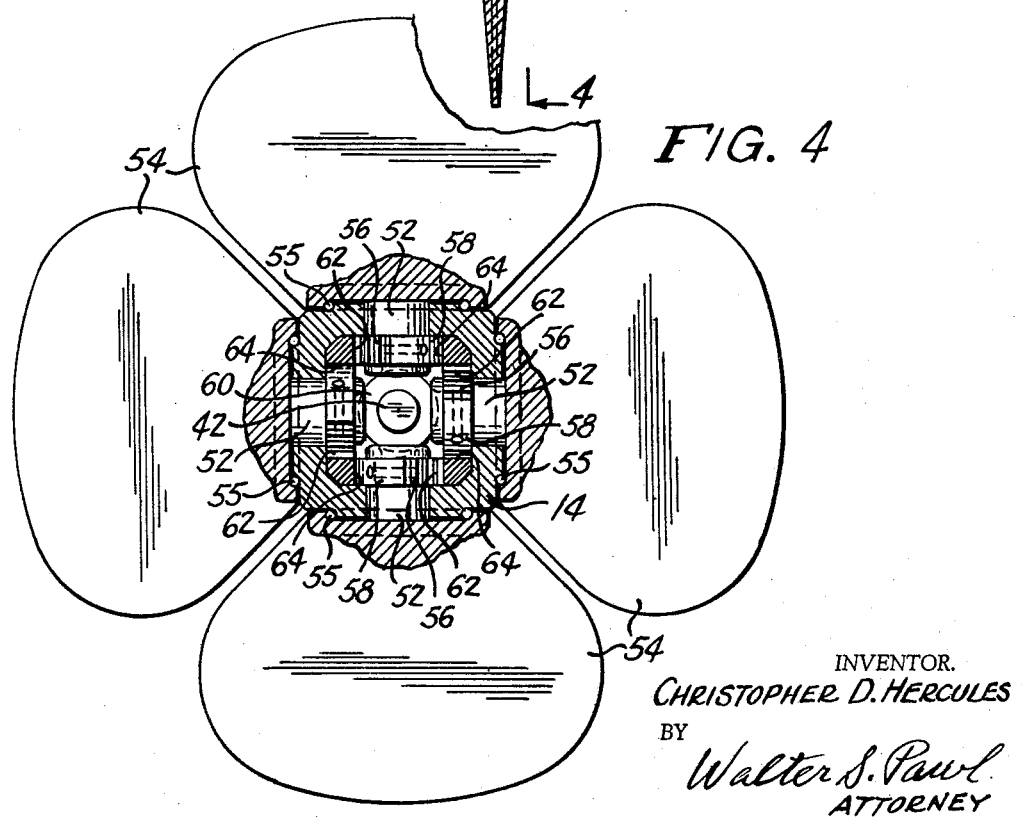

Further and more specific objects will become apparent in the following detailed description of a preferred form of the invention as applied to ship propulsion and illustrated in the accompanying drawings, wherein:

FIG. 1 is a section through a portion of the hull showing the propeller and a hydraulically actuated blade pitch control therefor, FIG. 2 is an enlarged stern view of the propeller, FIG. 3 is a sectional view thereof taken on the line 3—3 of FIG. 2, FIG. 4 is a sectional view taken on the line 4—4 of FIG. 3, FIG. 5 is a stern view of three bladed propeller adapted for similar control, and FIG. 6 is a stern view of a two bladed propeller for similar control.

Although the invention is illustrated as applied to ship propulsion, it may obviously be similarly applied to any propeller, where pitch control is required.

In FIG. 1, the four-bladed propeller 10 is shown provided with a hub casing 14 at the aft end of the hollow drive shaft 16. This drive shaft is composed of several sections 18, 20, 22, 24, 26, 28, 30, etc. coupled together by flexible couplings 32, a thrust bearing 34, a fluid coupling 36, to drive the propeller from the reduction gear 38, which is driven from a power means by the power shaft 40.

A control rod 42 which is axially reciprocable in the hollow shaft 16 is moved axially by means of the end collar 44 and yoke lever 46, which is remotely controlled through the hydraulically actuated piston 48 to control the propeller pitch.

Additional bearing supports 50 may be provided at suitably spaced intervals for the long shaft 16. The flexible couplings 32 provide some flexibility to the shaft to prevent binding or bending stresses thereon, when the hull weaves so as to cause misalignment of the bearings at the reduction gear, the fluid coupling, the thrust bearing and the other bearing supports.

The hub casing 14 is streamlined fore and aft to reduce turbulence and cavitation to a minimum, and has one or more radial bearings equally spaced around its axis for the individual blade shafts 52. Thus, a two-bladed propeller would have its blades 54 with large diameter bearings 55 spaced 180°, as shown in FIG. 6; a three-bladed propeller, 120°, as shown in FIG. 5; and a four-bladed propeller, 90°, as shown in FIGS. 1, 2 and 4. The large diameter bearings 55 supplement the bearings of shafts 52 to provide a firm reenforcement to the usual shaft bearings without measurably increasing frictional resistance to adjustment of the blades. The substantially flat bases of the blades 54 have overhanging circumferential flanges 57 forming axially fixed ball bearing races for cooperation with the inner races 59 around the raised steps on the hub casing.

The inner end of each blade shaft is provided with an arcuate rack or gear portion 56 on one side of the axial plane of the blade and a smooth arcuate surface 58 on the opposite side.

Rod 42 is connected to a composite rack-yoke member 60 comprising an individual rack-yoke for each blade, having a rack leg with an internal rack 62 meshing with the gear portion 56 of the corr sponding blade shaft 52, and a guide leg with a smooth guide surface 64 for sliding contact with the smooth arcuate surface 58 of the blade shaft.

The hub casing 14 has its fore and aft portions 66 and 68, respectively, streamlined to reduce turbulence in the water. Casing portion 66 is flared into the aft end of the shaft section 18 of the propeller drive shaft 16.

The rack-yokes are controlled in their axial movement by the rod 42 with a minimum of effort because the single line contacts between the smooth surfaces 58 on the blade shafts and the smooth surfaces 64 on the corresponding guide legs provide very little friction, and the pressures between the adjacent smooth and well lubricated surfaces of the several legs of the rack-yoke member and the hub casing wall provide little friction, even though these adjacent surfaces have to have a very close clearance in order to prevent distortion of the rack-yoke and resultant binding or damage to the controls when operating under great stresses at the higher speeds and loads. Each yoke is primarily guided by the blade shaft arcuate elements with which its legs cooperate on opposite sides of the shaft, but the inner walls of the casing must provide reenforcing guide surfaces to prevent distortion of the rack-yokes.

The purpose of the large-diameter flange bearings at the base of the blades is to provide greater strength against the canting of the blade shaft in its bearing caused by the propulsion forces reacting on the blade in operation. Without such flange bearings, the entire reaction of the operating forces on the blades would have to be taken up by the blade shaft bearing, producing binding stresses which would make it difficult to operate the pitch-adjusting controls.

Many obvious modifications in the details and arrangement of parts of this device may be made without departing from the spirit and scope of this invention, as defined in the appended claims.

What is claimed is:

1. An adjustable pitch propeller having a hollow drive shaft and a hub casing mounted at the end of the drive shaft, said casing having a substantially square cross section,
- a propeller blade extending radially from each side of said casing and having a flat circular base of maximum diameter rotatably mounted on the corresponding side of said casing,
- a mounting shaft extending from each circular base through a bearing in said casing and having an arcuate rack or gear portion on one side at the inner end of said mounting shaft and an arcuate guide surface on the opposite side thereof,
- an axially movable yoke member forming a yoke straddling each mounting shaft in said casing, each yoke comprising a pair of axially extending legs slidably mounted in angular recesses at the inside corners of said square casing and having opposing rack and flat guide surfaces coacting with the arcuate rack portion and arcuate guide surface respectively on the end of the corresponding mounting shaft for simultaneous adjustment of all the blades, each leg of each yoke serving also as the adjacent leg of the adjacent yoke to form a compact yoke member reenforced against distortion by the sides of said corner recesses,
- substantially conically streamlined end portions fore and aft of said casing, the forward end portion being streamlined into the aft end of said hollow drive shaft,
- a control rod extending freely through said hollow shaft in spaced relation thereto, and connected to said yoke member for controlling said adjustment of all the blades from the forward end of said hollow drive shaft, said rod having a substantially smaller diameter than the internal diameter of said hollow shaft, and
- the base of each blade having an overhanging circumferential flange forming a substantially closed ball bearing outer race and the hub casing having a raised circular step to form a ball bearing inner race and ball bearings coacting with said races.

2. An adjustable pitch propeller as defined in claim 1, said blades fanning out from their bases at a substantially 45% angle spread on each side, so as to substantially fill the peripheral area around said hub casing when said blades are alined normally to the axis of said casing.

References Cited in the file of this patent

UNITED STATES PATENTS

| | | |
|---|---|---|
| 608,265 | Olsen | Aug. 2, 1898 |
| 609,137 | Burrell | Aug. 16, 1898 |
| 1,718,525 | Casey | June 25, 1929 |
| 1,858,566 | Terry | May 17, 1932 |
| 1,869,280 | Roemisch | July 26, 1932 |
| 2,107,785 | Grabarse et al. | Feb. 8, 1938 |
| 2,456,361 | Atteslander | Dec. 14, 1948 |
| 2,478,244 | Cooley | Aug. 9, 1949 |
| 2,533,148 | Spiegel | Dec. 5, 1950 |

FOREIGN PATENTS

| | | |
|---|---|---|
| 2,267 | Great Britain | of 1892 |
| 22,979 | Denmark | Mar. 23, 1918 |
| 586,108 | Canada | Nov. 3, 1959 |
| 1,010,125 | France | Mar. 19, 1952 |